July 10, 1934.  E. D. BARRINGER  1,966,402
WEATHER STRIP THRESHOLD
Filed April 17, 1933
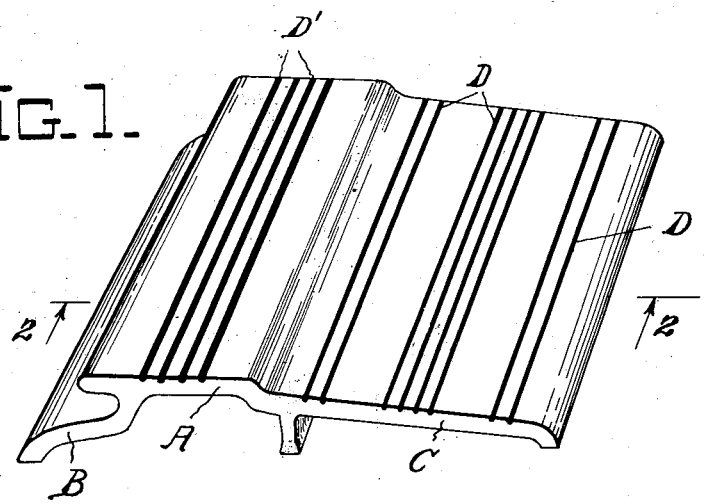
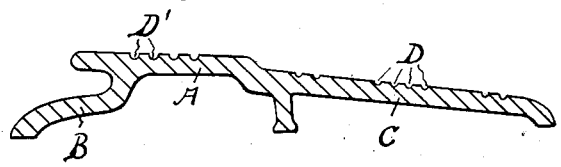
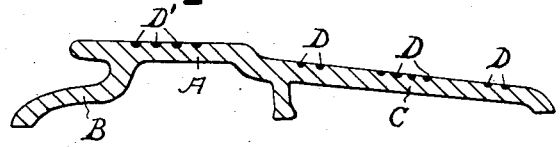
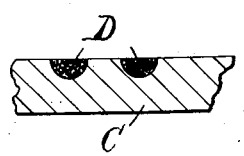
Inventor
ELMER D. BARRINGER.
By
Attorneys Patented July 10, 1934

1,966,402

UNITED STATES PATENT OFFICE 1,966,402

WEATHER STRIP THRESHOLD

Elmer D. Barringer, Cleveland, Ohio

Application April 17, 1933, Serial No. 666,634

2 Claims. (Cl. 20—64)

The object of my invention has been to produce a novel form of weatherstrip or threshold embodying a grooved construction possessing peculiar advantages. I have found in my experience in the manufacturing of thresholds of the class referred to, that by forming in the exposed or visible surface portions of the threshold, fine grooves of special cross section, it is possible to obtain a form of groove performing a dual function.

In the first place, the grooves made of relatively fine cross section and preferably curved or rounded at the base portions thereof, have a tendency to catch dirt which becomes wedged into the groove and thus tends to adhere to the walls thereof until the grooves are filled.

The accumulation of the dirt in the grooves tends to create a dark color effect, and peculiar as this may seem, thus enhances the appearance of the threshold from an artistic viewpoint.

I find that the provision of grooves of the kind to which I refer, generally adds to the appearance of the threshold whether dirt or foreign matter catches in the grooves or not, but I additionally find that in the second place, the dirt catching characteristic of the grooves adds to the appearance of a threshold or weatherstrip to a greater extent than is obtainable when the groove is not filled with dirt or foreign matter.

I am aware that it has been proposed in the prior art of threshold weatherstrips to employ relatively large and deep grooves for anti-slippage purposes, and therefore, I make no claim for a construction such as now just mentioned.

Where these larger anti-slippage grooves are employed, the essential object is that the size of the groove be sufficient to enable dirt and other foreign matter that might find its way into the grooves to be readily swept therefrom for otherwise the anti-slippage function of the grooves would be interfered with.

In reference, however, to the grooved structure of my threshold, I purposely employ a fineness of cross section of groove, that is a groove so shallow in depth and narrow in width that it will retain the dirt or foreign matter that lodges therein, even though a broom or similar cleaning appliance is swept thereover, the compacting of the dirt or foreign matter in the grooves being such as to prevent ordinary sweeping from dislodging said dirt or foreign matter.

In the carrying out of my invention, I show the same in conjunction with a conventional form of a brass extruded threshold, and in the accompanying drawing:—

Figure 1 is a perspective view of such a threshold.

Figure 2 is a cross sectional view of the same showing the grooved formation of my invention with the grooves empty.

Figure 3 is a view siimlar to Figure 2, but showing the grooves filled with dirt.

Figure 4 is an enlarged cross section bringing out more fully the curved sectional configuration of the grooves, the grooves shown being filled with dirt.

It is to be understood, of course, that the particular threshold which is illustrated in the drawing, and which comprises the top portion A and the opposite sides B and C, is not material to the invention, so far as its general configuration is concerned, since these thresholds take different forms in general weatherstrip practise.

On the exposed and particularly visible surfaces of the weatherstrip, I form the peculiarly fine grooves D which may be arranged in series of greater or less number, dependent upon the whim of the manufacturer, and a possible preference for more grooves at one place than another, in order to enhance the appearance of the ultimate article when placed in position for use.

The grooves D, seen best in Figure 2 and Figure 4, are of half round formation in cross section and carried by the side C so as always to be exposed to view. This formation of the grooves, I have found to be best, in order that they may subserve their dirt catching function, the tendency of dirt or foreign matter being to compact in said grooves, making it very difficult to remove same. Under these conditions, the compacted dirt, or foreign matter referred to, tends to blacken the space between the side walls of the groove, and this blackened appearance contrasts with the brassy or polished finished surface of the threshold and gives rise to the results which have been heretofore referred to.

The grooves D in the top portion A of the sill or threshold are designed for usual anti-slipping purposes and are not intended to be effective to hold the dirt.

Having thus described my invention, what I claim as new and desire to secure by Letters Patent of the United States, is:—

1. As an article of manufacture, a weatherstrip device for use in a position where it receives dirt on the upper surface thereof and comprising a top and a side portion, said device having a plurality of fine grooves in the upper surface of said side portion for receiving dirt and wherein said dirt is compacted, said grooves being so shallow and narrow that ordinary sweeping will not dislodge the dirt, said grooves producing a visible zone in the upper surface of the side portion distinguishable over the remainder of the surface and contrasting therewith.

2. As an article of manufacture, a weatherstrip device comprising a tread and a side portion, said tread portion having therein a plurality of relatively coarse grooves providing anti-slip characteristics, and said side portion having therein a plurality of relatively fine grooves in a position for receiving dirt incident to use of the device and into which the dirt will be compacted, said fine grooves being relatively narrower and shallower than the anti-slip grooves to the end that ordinary sweeping will not dislodge the dirt from the former, the dirt retaining grooves producing a visible zone in the upper surface of the side portion distinguishable over the remainder of the surface and contrasting therewith.

ELMER D. BARRINGER.